United States Patent Office 2,789,113
Patented Apr. 16, 1957

2,789,113
N-OXIDES OF RESERPIC ACID COMPOUNDS

William Irving Taylor, Summit, N. J., assignor to Ciba Pharmaceutical Products, Inc., Summit, N. J., a corporation of New Jersey No Drawing. Application December 27, 1955,
Serial No. 555,319

10 Claims. (Cl. 260—286)

This is a continuation-in-part of my copending application Serial No. 536,288, filed September 23, 1955, now abandoned.

This invention relates to a series of new organic pentacyclic compounds related to reserpine and a process for their preparation.

I have found that compounds having the nucleus of the formula:

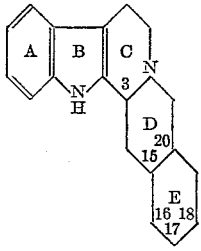

at least one substituent in ring E and possessing the stereoconfiguration of reserpine in positions 3, 15 and 20 when treated with N-oxidizing agents, yield compounds containing one atom of oxygen more than the starting materials. My investigations have shown that the new compounds are the N-oxides of the starting materials and, therefore, possess the following grouping:

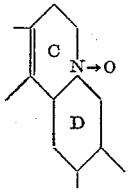

As starting materials there may be used a wide variety of compounds having the above-mentioned nucleus, for example those having substituents in at least one of the 16, 17 and 18 positions, such as free, esterified or etherified hydroxyl, free or esterified carboxyl or free or functionally converted, e. g. ketalized keto groups. These compounds may be further substituted, for example in ring A, e. g. in 11-position, by lower alkoxy, such as methoxy groups.

Included within the scope of this invention as suitable starting materials are: 18-halogeno-desoxy-reserpic acid and esters thereof, reserpinol, deserpidinol, reserpinediol and deserpidinediol and esters thereof and especially reserpic acid and alcohol esters thereof, reserpic acid lactone, and the corresponding compounds of the deserpidine series, esters of reserpic acid in which both functional groups are esterified, such as rescinnamine or reserpine; 3-epi-alloyohimbone, 3-epi-α-yohimbic acid and esters thereof, and the alkyl anhydroreserpates.

The process of the invention may be carried out with N-oxidizing agents such as hydrogen peroxide or ozone. I have found, however, that the reaction is more advantageously performed with inorganic or organic peracids such as monopersulfuric acid or p-toluene-persulfonic acid. The preferred oxidizing peracids, however, are organic percarboxylic acids, such as peracetic acid, monoperphthalic acid and especially perbenzoic acids such as perbenzoic acid itself.

The N-oxidation may be conducted with excellent results with perbenzoic acid in a diluent such as benzene, toluene, chloroform, ethylene dichloride, ethanol or methanol. In the oxidation reaction an excess of oxidant and raised temperatures should be avoided in order to prevent further oxidation of the molecule. The N-oxides formed are isolated according to general methods known in the art, for example crystallization.

The starting materials may be used as free bases or in the form of salts thereof. Depending on the working conditions employed, the N-oxides may be isolated as free compounds or, for example, if peracids are used, in the form of their salts. The free compounds may be converted into acid addition salts in the usual manner by the addition of acids. These salts in turn can be converted into the free bases, e. g. by the action of alkali. If the compounds obtained possess a free carboxyl group, salts with metals such as alkali or earth alkali metals may also be formed.

The compounds made by the process of the invention are generally useful as intermediates for the preparation of medicaments. They may also be used as such, for example on account of their sedative activity. They can be subjected to reactions converting their functional groups in ring E. Thus, reserpic acid N-oxide or deserpidic acid N-oxide may be converted into their alcohol esters, e. g. lower alkyl esters, for example by the reaction with alcohols, such as methanol or ethanol in the presence of an esterification catalyst, or by reaction with diazo alkanes, e. g. diazomethane. Such esters, in turn, may be hydrolyzed to the free acids, for example by treatment with an aqueous alkaline medium, e. g. aqueous alcoholic potassium hydroxide.

Esters of reserpic acid N-oxide, in which both esterifiable groups are esterified, can be saponified partially to alcohol esters of reserpic acid or completely to reserpic acid. Thus one may work with different alkaline saponifying agents or with the same but under different conditions, as e. g. in the presence or absence of water, at a lower or higher temperature or for a longer or shorter period of time. For example, when a diester is heated for a comparatively long time with the solution of an alkali hydroxide, such as potassium hydroxide in an alcohol, such as methanol, both ester groups are hydrolyzed. When the treatment is performed with the same agent under milder conditions, e. g. for a short time only, only the esterified hydroxyl group is split.

For partial saponification, however, there is used as alkaline saponifying agent especially one capable of converting an esterified hydroxyl group into a free hydroxyl group with the formation of an ester, that is to say, by alcoholysis, the carbomethoxy group being re-esterified, depending on the conditions employed. It is thus of advantage to work in an anhydrous alcohol in the presence of an alcoholate, such as an alkali metal or aluminum alcoholate or some other alcoholyzing agent, such as sodium carbonate or piperidine. In absolute methanol in the presence of e. g. an alkali methylate, such as sodium methylate or aluminum tertiary butylate, piperidine, or sodium carbonate, there is formed methyl reserpate N-oxide. When the alcoholysis is carried out in other absolute alcohols, such as ethanol or butanol in the presence, for example, of the corresponding alcoholates, such as sodium ethylate or sodium butylate or other alcoholyzing agents there are obtained by re-esterification the corresponding reserpate N-oxides such as ethyl or butyl reserpate N-oxide. The products of this process are isolated by known methods.

A specific feature of my invention is a certain group of N-oxides which may be prepared according to the process of my invention, and which comprises the N-oxides of alcohol esters of reserpic acid wherein the hydroxyl group of reserpic acid is esterified with an acid, such as an organic sulfonic or carboxylic acid and the salts thereof.

These compounds possess quite unexpectedly a very pronounced sedative activity and can be used therapeutically for the treatment of states of nervousness, anxiety and for the treatment of mental disorders. A special advantage of these N-oxides over the corresponding tertiary amines resides in their increased solubility in polar vehicles such as alcohols.

Valuable N-oxides of this type are, for example, the N-oxides of lower alkyl—especially methyl-reserpates esterified with aliphatic acids such as unsubstituted or substituted lower alkane carboxylic acids, e. g. acetic, propionic, succinic, or halogeno-acetic acid; the N-oxides of lower alkyl reserpates which are esterified with carboxylic acids of the aromatic, araliphatic or heterocyclic series, such as benzoic, phenyl acetic, mandelic, tropic, cinnamic, syringic, p-chlorobenzoic, p-toluic, naphthoic, p-acetylamino-benzoic, quinoline carboxylic, salicylic, protocatechic, resorcylic, orsellinic, pyrogallic, vanillic and iso-vanillic acid; and, although less advantageously, with aromatic sulfonic acids, e. g. p-toluene sulfonic acid.

Particularly useful with respect to their sedative activity are the N-oxides of esters of lower alkyl reserpates with monocyclic aromatic or araliphatic carboxylic acids, the nuclei of which are substituted by at least one lower alkoxy group such as 4-methoxy-, 3,4-dimethoxy-, 3,4-methylenedioxy-, 3,4,5-trimethoxy-benzoic acid, 3,4,5-trimethoxy-cinnamic acid and the like or with monocyclic, mono-heterocyclic carboxylic acids such as furan, thiophene, pyrrol or pyridine carboxylic acids, e. g. furan-2-carboxylic acid, thiophene-2-carboxylic acid, nicotinic acid or isonicotinic acid and the like. As specific examples of useful sedative compounds in this series may be given:

The N-oxides of reserpine, methyl O-(3,4-dimethoxy-benzoyl)-reserpate, methyl O-(3,4-methylenedioxy-benzoyl)-reserpate, methyl O-(3,4,5 - triethoxy-benzoyl)-reserpate, ethyl O-(3,4,5-trimethoxybenzoyl)-reserpate, methyl O-furoyl-(2)-reserpate, methyl O-acetyl-reserpate, methyl O-(O'-carbethoxy-syringoyl)-reserpate and rescinnamine.

The active compounds can also be used in the form of their non-toxic therapeutically useful salts, such as salts with hydrohalic acids, sulfuric acid, phosphoric acid, nitric acid, hydroxyethane sulfonic acid, toluene sulfonic acid, acetic acid, tartaric acid, or citric acid and the like.

The new pharmacologically active esters of the invention and the salts thereof can be formulated for therapeutic administration into pharamceutical compositions. These compositions may be in any suitable solid or liquid dosage form, especially in a form suitable for oral or parenteral administration, e. g. tablets, powder, capsules, pills, solutions, emulsions or suspensions, e. g. in the form of ampouled injectable solutions. As pharmaceutical carriers there may be employed materials or mixtures of such which do not react with the N-oxides and are therapeutically useful. For this purpose substances such as water, gelatine, lactose, starch, magnesium stearate, talc, vegetable oils, benzyl alcohol, ascorbic acid, gums, glycols such as propylene glycol or polyalkylene glycol, petroleum jelly, cholesterol, tragacanth, alcohol or mixtures thereof may be employed. In preparing the novel compositions the N-oxides or their salts are admixed with the pharmaceutical carrier and formulated in the desired dosage unit form according to pharmaceutical practice. The compositions may be sterilized and may contain auxilliary substances such as preservative, stabilizing, wetting or emulsifying substances; salts for the control of the osmotic pressure or buffer substances or other therapeutically active substances. The doses used depend largely on the condition of the patient and the desires of the physician. Doses from about 0.1 mg. to about 100 mg., preferably from about 0.2 mg. to about 20 mg. daily are appropriate.

The invention includes also any modification of the process which comprises using as starting material a compound obtainable as an intermediate product at any stage of the process and carrying out the remaining process steps.

The starting materials used are known or can be prepared according to methods known for the preparation of analogous compounds. Reserpic acid and esters thereof may be prepared according to the process of copending applications, Serial No. 373,461, filed August 10, 1953 now abandoned, Serial No. 526,780, filed August 5, 1955, by Emil Schlittler, and Serial No. 411,541, filed February 19, 1954 by Paul Reuben Ulshafer. Deserpidic acid and esters thereof may be prepared according to the process of copending application, Serial No. 471,519, filed November 26, 1954 by Paul Reuben Ulshafer. Reserpic acid lactone is disclosed in copending application, Serial No. 387,532, filed October 21, 1953 by Harold Belding MacPhillamy et al., deserpidic acid lactone in copending application Serial No. 471,520, filed November 26, 1954 by Paul Reuben Ulshafer.

The following examples illustrate the invention without being intended to limit it.

*Example 1*

6.5 grams of reserpine in 200 ml. methylene chloride are treated drop-wise with 24.2 ml. of an 0.892 N solution of monoperphthalic acid in chloroform at −5° C. The reaction mixture is then extracted with dilute ammonia, washed with water, dried over sodium sulfate, concentrated to dryness, and the residue crystallized from ethyl acetate containing a little water. The thus obtained reserpine N-oxide is further purified by chromatography over activated alumina. It melts at 218–220° C. (dec.).

*Example 2*

5.70 grams of reserpine in 130 ml. methylene dichloride are treated drop-wise with 30.8 ml. of an 0.61 N solution of perbenzoic acid in chloroform at 0° C. After 15 minutes the reaction mixture is washed with dilute ammonia, then with water, dried over sodium sulfate, evaporated to dryness and the residue crystallized from a mixture of methylene chloride and moist ethyl acetate to yield reserpine N-oxide described in Example 1.

*Example 3*

5.26 grams of rescinnamine in 130 ml. methylene dichloride are treated drop-wise with 28.2 ml. of an 0.61 N solution of perbenzoic acid in chloroform at 0° C. After 15 minutes the reaction mixture is washed with dilute ammonia, then with water, dried over sodium sulfate, evaporated to dryness and the residue crystallized from a mixture of methylene chloride and moist ethyl acetate to yield rescinnamine N-oxide melting at 217° C. (dec.).

*Example 4*

0.201 gram of methyl O-acetyl reserpate in 30 ml. methylene dichloride are treated drop-wise with 1.4 ml. of an 0.61 N solution of perbenzoic acid in chloroform at 0° C. After 15 minutes the reaction mixture is washed with dilute ammonia, then with water, dried over sodium sulfate, evaporated to dryness and the residue crystallized from moist ethyl acetate to yield methyl O-acetyl reserpate N-oxide melting at 258° C. (dec.).

*Example 5*

0.391 gram of methyl O-(O'-carbopropoxy-syringoyl)-reserpate in 30 ml. methylene dichloride are treated drop-wise with 1.86 ml. of an 0.61 N solution of perbenzoic acid in chloroform at 0° C. After 15 minutes the reaction mixture is washed with dilute ammonia, then with water, dried over sodium sulfate, evaporated to dryness and the residue crystallized from a mixture of methylene chloride and moist ethyl acetate to yield methyl O-(O-carbopropoxy-syringoyl)-reserpate N-oxide melting at 208–209° C. (dec.).

Example 6

0.032 gram of methyl O-nicotinoyl-reserpate in 15 ml. methylene dichloride are treated drop-wise with 0.376 ml. of an 0.61 N solution of perbenzoic acid in chloroform at 0° C. The reaction mixture is treated in the manner set forth in Example 4 to yield methyl O-nicotinoyl-reserpate N-oxide melting at 206–208° C. (dec.).

Example 7

0.125 gram of methyl O-furoyl-(2)-reserpate in 30 ml. methylene dichloride are treated drop-wise with 0.79 ml. of an 0.61 N solution of perbenzoic acid in chloroform at 0° C. The reaction mixture is treated in the manner set forth in Example 4 to yield methyl O-furoyl-(2)-reserpate N-oxide melting at 209–210° C. (dec.).

Example 8

0.615 gram of reserpine diol diacetate in 50 ml. methylene dichloride are treated drop-wise with 4.24 ml. of an 0.61 N solution of perbenzoic acid in chloroform at 0° C. The reaction mixture is treated in the manner set forth in Example 4 to yield reserpine diol diacetate N-oxide melting at 217–218° C. (dec.).

Example 9

22.8 milliliters of an 0.03 N solution of ozone in ethyl acetate is added to a solution of 204 mg. reserpine in 50 ml. chloroform. The mixture is allowed to stand for two hours in an ice-bath. The crystals formed are filtered off, dissolved in a mixture of methylene chloride and methanol, shaken vigorously with dilute aqueous ammonia, washed with water and dried over sodium sulfate. The solution is concentrated to dryness and the residue crystallized from a mixture of methylene chloride and moist ethyl acetate to yield reserpine N-oxide described in Example 1.

Example 10

To 0.20 g. of reserpine N-oxide in 5.0 ml. of methanol there is added a solution of 0.4 g. of potassium hydroxide in 1.0 ml. water. The mixture is boiled under reflux for about two hours in an atmosphere of nitrogen. After cooling, 0.6 ml. glacial acetic acid is added. The mixture is concentrated under reduced pressure to a solid residue which is then treated with 3 portions each of 10 ml. of acetone. The mixture is filtered after each trituration. The filtrates are combined and evaporated under reduced pressure to a solid residue. After crystallization from methanol, reserpic acid N-oxide melting at 240–242° C. (dec.) is obtained.

Example 11

To a suspension of 0.46 g. of reserpic acid N-oxide in 15 ml. of methanol, which was warmed to obtain a partial solution and then cooled in an ice bath, there is added 120 ml. of an ethereal solution of diazomethane (prepared from 3.3 g. of nitrosomethylurea) is added. The mixture is kept in an ice-bath for several hours with occasional agitation. At the end of this time the solid is almost completely dissolved. After standing at ice-bath temperature for an additional 1 and ½ hours and at room temperature for about 16 hours, the solution is concentrated at atmospheric pressure to 30 ml. and then under reduced pressure to a solid residue. The thus obtained crude methyl reserpate N-oxide is converted into its nitric acid salt as follows:

0.10 gram of crude methyl reserpate N-oxide are dissolved in 1.0 ml. of methanol and 0.1 ml. of 17 percent nitric acid is added. The methyl reserpate N-oxide nitrate formed is filtered off and recrystallized from methanol. The compound melts at 250–253° C. (dec.)

In the same way using other diazo alkanes such as diazo ethane or diazo propane, the corresponding ethyl or propyl reserpate N-oxides are obtained. If deserpidic acid N-oxide is used as starting material, the corresponding alkyl deserpate N-oxides are obtained.

Example 12

To 0.19 g. of reserpine N-oxide a solution of 0.02 g. of sodium in 10 ml. methanol is added. The mixture is boiled under reflux for a half hour, cooled and diluted with 10 ml. of water. The mixture is made strongly acidic by cautious addition of concentrated hydrochloric acid and extracted with 20 ml. of ether and again with 2 portions each of 10 ml. of ether. The extracts are washed separately with 2 portions of 5 ml. each of 5 percent sodium chloride solution, the same portions being used for all extracts. The above aqueous acid phase is combined with the two sodium chloride solutions and the entire volume then made basic with concentrated aqueous ammonia and extracted three times with 10 ml. of methylene chloride. The combined methylene chloride extracts are dried over anhydrous potassium carbonate and evaporated under reduced pressure. The remaining residue represents crude methyl reserpate N-oxide. It is dissolved in ethyl acetate, filtered, the solvent evaporated under reduced pressure and the solid residue dissolved in 1.0 ml. of methanol. To this solution 0.1 ml. of 17 percent nitric acid is added to yield methyl reserpate N-oxide nitrate in crystalline form. The compound is recrystallized from methanol; M. P. 249–251° C. (dec.).

In the same way using sodium in ethanol, ethyl reserpate N-oxide is obtained. Other alkyl reserpate N-oxides are obtained in a similar manner.

Example 13

0.039 gram of n-butyl O-acetyl-reserpate is treated in 20 ml. methylene chloride with 0.162 ml. of an 0.962 N solution of perbenzoic acid in methylene chloride. After 15 minutes in an ice-bath the solution is washed with dilute ammonia, water, and dried over sodium sulfate and concentrated to dryness. The residue is crystallized from moist ethyl acetate to give n-butyl O-acetyl-reserpate N-oxide melting at 225–227° C. (dec.).

Example 14

0.411 gram of methyl reserpate are treated with 2.06 ml. of an 0.962 N solution of perbenzoic acid in methylene chloride. After 15 minutes in an ice-bath the reaction mixture is concentrated to dryness. The residue is crystallized from methanol to afford methyl reserpate N-oxide benzoate melting at 160° C. (dec.). In the same manner methyl deserpidate is oxidized to methyl deserpidate N-oxide.

Example 15

0.072 gram of reserpic acid is treated in 20 ml. methylene chloride with 0.336 ml. of an 0.962 N solution of perbenzoic acid in methylene chloride. After 15 minutes in an ice-bath the solution is concentrated to dryness and the residue crystallized from 95 percent ethanol to furnish reserpic acid N-oxide benzoate melting at 222–225° C. (dec.). In the same manner deserpidic acid is oxidized to deserpidic acid N-oxide.

Example 16

Reserpine N-oxide can be converted into its salts in the following way:

To a solution of reserpine N-oxide in methanol a slight excess of perchloric acid is added whereupon reserpine N-oxide perchlorate crystallized out, M. P. 240–242° C. (dec.).

To a solution of reserpine N-oxide in methanol a slight excess of dilute hydrochloric acid is added and the precipitated salt is filtered off and recrystallized by dissolving it in hot methylene chloride-methanol and distilling off the former solvent whereupon the reserpine N-oxide hydrochloride crystallizes out, M. P. 235–238° C. (dec.)

In an analogous manner reserpine N-oxide sulfate, M. P. 236–237° C. (dec.), reserpine N-oxide nitrate, M. P. 242–250° C. (dec.) and reserpine N-oxide oxalate, M. P. 210–212° C. (dec.) are prepared.

*Example 17*

0.321 gram of 3-epi-α-yohimbine (alkaloid 3078) is treated in 30 ml. methylene chloride with 2.92 ml. of an 0.61 N solution of perbenzoic acid in chloroform at 0.° C. After 15 minutes the reaction mixture is concentrated to dryness and the residue is crystallized from methanol-water. The thus obtained 3-epi-α-yohimbine N-oxide benzoate sinters at 149° C. and melts at 160° C.

Alkaloid 3078 used as starting material can be obtained as follows: 40 kg. of finely powdered root material of Rauwolfia serpentina Benth. are percolated with 200 l. of methanol till a positive alkaloid reaction with Mayer's reagent is no longer obtained. The methanol extract is evaporated to dryness in vacuo, Hyflo is added and the residue triturated three time with a total of 20 l. of water. 20 l. of ether containing 10 percent methanol are added and the pH adjusted to 7 by addition of aqueous ammonia. After stirring for 10 minutes the organic layer is separated. The aqueous solution is again covered with 20 l. of ether containing 10 percent methanol and the pH brought to pH 9.2. After stirring for 10 minutes, the aqueous layer is discarded and the organic layer clarified by filtration and then stirred for 30 seconds with 350 ml. of 2 N hydrochloric acid, the aqueous layer is quickly separated and the organic layer extracted 4 times with 150 ml. portions of 2 N hydrochloric acid, stirring for 2 minutes each time. The first two acid extracts are combined to form Extract I, and the last three are combined to form Extract II. On standing for three hours at 5° C., Extract I yields 35 g. and Extract II, 3.5 g. of a crystallizate. An additional amount of 20 g. crystallizes from the filtrate after 18 hours. The mother liquors are combined and the bases precipitated by addition of excess aqueous ammonia. The mixture is stirred for a few hours and allowed to stand overnight at 5° C. to convert the gummy precipitate to a granular form. The light brown precipitate is filtered, washed with water and dried in vacuo at 40° C. (150 g.). 7 grams of this residue in 50 ml. of benzene is chromatographed on 200 g. of acid washed alumina (activity II—III) and eluted with benzene, then benzene containing increasing amounts of acetone and then with 50 ml. portions of methanol.

Alkaloid 3078 is present in the first three methanol extracts. They are combined, evaporated to dryness to give a residue which yields by crystallization from methanol-water (1:1) alkaloid 3078, melting at 124–128°, $[\alpha]_D^{26}= -96°$ (pyridine).

*Example 18*

The esters of alkyl reserpates used as starting materials in the above examples can be obtained according to the following description, wherein the relationship between parts by weight and parts by volume is the same as of the gram to the milliliter.

7,000 parts by weight of powdered bark obtained from the roots of Rauwolfia serpentina Benth. are percolated with 35,000 parts by volume of methanol. After evaporating the methanol extract, 1,050 parts of a dark colored powder are obtained, which is treated with water repeatedly. The remaining insoluble residue is then treated five times, each time with 1,500 parts by volume of 10 percent aqueous acetic acid and the solution separated from the oily portion by centrifugation. The brown acetic acid solution is either concentrated at low temperature or diluted with half of its volume of water and then has a pH of about 3.9. This solution is extracted with a total of 3,500 to 4,000 parts by volume of chloroform divided in 3 to 4 portions. The chloroform extracts are washed once with potassium carbonate solution and twice with water, then dried with sodium sulfate and completely evaporated in vacuum. The residue of 70 to 80 parts by weight is a green-brown colored powder. For further processing, this residue is dissolved in benzene and chromatographed on 1,000 to 1,200 parts by weight of neutral aluminum oxide (Activity II—III according to the Brockmann standard). By eluting with benzene a small amount of a yellow oil is obtained first and afterwards 0.9 part by weight of a physiologically inactive crystalline material with a M. P. of 238–9° C. and then the sedatively active component follows. As soon as the main part of the active component is eluted, the chromatographic column is then further eluted with a mixture of 2 parts by volume of benzene and 1 part by volume of acetone. By doing so the remainder of the sedative principle is eluted and then physiologically inactive crystalline material with an M. P. 141–143° C. follows. The fractions which contain the sedative factor are evaporated to dryness. By recrystallizing the residue from hot acetone or a mixture of chloroform and ether, 6.5 to 7 parts of residue (reserpine) are obtained in almost colorless crystals melting at 262–263° C. (with decomposition) and with a rotation $[\alpha]_D= -117°$ C. (chloroform).

One part by weight of reserpine is refluxed with 40 parts by volume of N methanolic potassium hydroxide, under nitrogen for 1½ hours. The solution is cooled, adjusted to pH 7–2 with 6 N hydrochloric acid and filtered. The filtrate is evaporated almost to dryness, slurried twice with 25 parts by volume each of ether and partially dissolved in 25 parts by volume of methanol. The methanol is evaporated almost to dryness and the residue again extracted with two 25 parts by volume portions of ether. The solid remaining is dissolved in 50 parts by volume of methanol, adjusted with N methanolic potassium hydroxide to about pH 6 and evaporated almost to dryness. Addition of 50 parts by volume of chloroform dissolves most of the material. The chloroform solution is evaporated and the residue crystallized from a small amount of methanol with addition of ether. The thus obtained reserpic acid hydrochloride melts at 255–258° C.

0.1 part by weight of reserpic acid hydrochloride is dissolved in 10 parts by volume of methanol and stirred with 0.125 part by weight of powdered silver carbonate for 10 minutes. The solution is filtered to remove excess silver carbonate and the silver chloride formed, and the filtrate evaporated to dryness, whereupon a pale yellow solid is obtained. Recrystallization from 1–2 parts by volume of methanol yields almost colorless crystals of reserpic acid, M. P. 239–245° C.

To a suspension of 1.2 parts by weight of reserpic acid hydrochloride in 50 parts by volume of 50 percent ether-methanol is added an excess of an ethereal solution of diazomethane. Nitrogen is evolved and most of the material gradually goes into solution. The reaction mixture is allowed to stand about 18 hours at room temperature and then the excess diazomethane is removed by distillation. The resulting solution is filtered and concentrated to dryness in vacuo at not over 40° C. The crystalline residue is recrystallized from methanol-ether solution and yields methyl reserpate, M. P. 240–242° C.

A solution of 5 parts by weight of methyl reserpate and 5 parts by volume of nicotinoyl chloride in 100 parts by volume of anhydrous pyridine is allowed to stand at 5° C. for two days. Most of the pyridine is removed in vacuo and the residue shaken with 200 parts by volume of ethyl acetate and 40 parts by volume of 5 percent aqueous sodium hydroxide. The ethyl acetate phase is next shaken with 40 parts by volume of 5 percent aqueous hydrochloric acid, whereupon methyl reserpate nicotinate hydrochloride is formed in solution. The solution is basified with ammonia and the methyl reserpate nicotinate removed by filtration. It is recrystallized from acetone-water to yield the pure methyl O-nicotinoyl-reserpate, M. P. 255–256° C. (with decomposition).

A solution of 5 parts by weight of methyl reserpate and 4.6 parts by volume of 2-furoyl chloride in 100 parts by volume of anhydrous pyridine was allowed to stand at 5° C. for two days. Most of the pyridine was removed in vacuo and the residue shaken with 200 parts by volume of ethyl acetate and 40 parts by volume of 5 percent sodium hydroxide solution. The ethyl acetate phase was then shaken with 40 parts by volume of 5 percent aqueous hydrochloric acid. The hydrochloride of the methyl reserpate 2-furoate began to crystallize and was filtered after ½ hour. On recrystallization from water it melted at 258–260° C. The ester in the form of its free base was obtained by dissolving methyl reserpate 2-furoate hydrochloride in 20 parts by volume of a warm 1:9 water-acetone mixture and basifying the resulting solution with aqueous ammonia. On addition of water methyl O-furoyl-(2)-reserpate separated. On recrystallization from acetone-water, the free base melted at 240–242° C. (with decomposition).

To 0.80 part by weight of methyl reserpate and 1.0 part by weight of 3,4,5-trimethoxycinnamoyl chloride were added 10 parts by volume of dry distilled pyridine. The mixture was stirred and cooled until a nearly complete light amber-colored solution was obtained. An additional 5 parts by volume of pyridine were added and the reaction mixture cooled to 5° C. After 15 minutes a crystalline precipitate was obtained and 5 parts by volume of benzene were added and the reaction mixture kept at 5° C. for 65 hours. The resulting solution was evaporated under vacuum to a viscous syrup. When small portions of toluene were added and evaporated to complete removal of the pyridine, the resulting amber-colored solid froth was extracted with ether and the ether insoluble portion was taken up in methylene chloride, washed with water, and dried over sodium sulfate. It was then concentrated under vacuum whereupon the residue obtained was chromatographed on 35 parts by weight of alumina (Activity II—III). Fractions eluted with benzene-acetone mixtures and with acetone containing small amounts of methanol gave on crystallization from benzene 3,4,5-trimethoxycinnamate of methyl reserpate.

One part by weight of methyl reserpate and 1.9 parts by weight of O-carbethoxy-syringoyl chloride were dissolved in 20 parts by volume of anhydrous pyridine and allowed to stand at 5° C. for 3 days. An equal volume of ice was then added, and the mixture evaporated to dryness in vacuo. The residue was dissolved in 50 parts by volume of chloroform and washed in succession with three 50 parts by volume portions of 2 percent sodium hydroxide solution and two 50 parts by volume portions of water. The chloroform solution was dried over sodium sulfate and evaporated to dryness. The residue was dissolved in 15 parts by volume of benzene and chromatographed on a 10 part by weight column of II—III grade alumina. Eluates of benzene, 90 benzene: 10 acetone, 80 benzene: 20 acetone, 60 benzene: 40 acetone, and acetone were removed. From the 90 benzene: 10 acetone eluate there was recovered crystalline methyl O-(O'-carbethoxy-syringoyl)-reserpate, M. P. 175–178° C. on crystallization from acetone.

0.34 part by weight of methyl O-(O'-carbethoxy-syringoyl)-reserpate was dissolved in 100 parts by volume of 3 N alcoholic ammonia and allowed to stand at 5° C. for three days. The solution was concentrated in vacuo to dryness and the solid recrystallized from a small volume of anhydrous ethanol, yielding methyl O-syringoyl-reserpate, M. P. 190–192° C.

To a solution of 0.2 part by volume of methyl O-syringoyl-reserpate in 20 parts by volume of benzene and 2 parts by volume of pyridine were added 2 parts by volume of propyl chloroformate. The mixture was refluxed for 5 minutes and after 30 minutes at room temperature evaporated in vacuo. The sticky residue became granular on addition of 25 parts by volume of water. The granular product was water washed and dissolved in methanol and stirred with 0.3 part by weight of silver carbonate for 5 minutes. The solution was filtered, evaporated in vacuo and the residue recrystallized from acetone-water yielding methyl O-(O'-carbopropoxy-syringoyl)-reserpate, M. P. 180–184° C.

A suspension of 0.9 part by weight of methyl reserpate in 10 parts by volume of acetic anhydride is heated on the steam bath for one hour and then allowed to stand at room temperature overnight. At the end of this time the crystals which have formed are filtered and the filtrate concentrated in vacuo to one-third its volume. Again the crystals are filtered and, when combined with the previous crop, yield methyl O-acetyl-reserpate M. P. 287–290° C.

0.380 part by weight of reserpic acid hydrochloride in 10 parts by volume of methanol are treated with excess diazo-n-butane in ethereal solution until a permanent yellow color is maintained. After thirty minutes the solvent is removed and the residue is washed once with ether and filtered to yield crude crystalline butyl reserpate. This is dissolved in 5 parts by volume of pyridine and 300 parts by weight of acetic anhydride and after one hour water is added and the whole allowed to stand for one hour. Extraction with methylene chloride affords after chromatography over activated alumina n-butyl O-acetyl-reserpate.

What is claimed is:

1. A compound selected from the group consisting of those having the general formula:

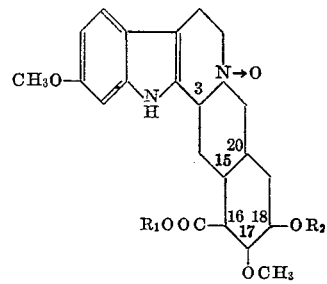

which possess the stereoconfiguration of reserpine in the 3-, 15- and 20-positions, wherein $R_1$ is lower alkyl, and $R_2$ is a member of the group consisting of lower alkanoyl, benzoyl, mono-lower alkoxy-benzoyl, di-lower alkoxy-benzoyl, tri-lower alkoxy-benzoyl, methylenedioxy-benzoyl, O-carbo-lower alkoxy-syringoyl, phenylacetyl, cinnamoyl, tri-lower alkoxy-cinnamoyl, furoyl, nicotinoyl and isonicotinoyl, with the proviso that when $R_1$ is methyl, $R_2$ is lower alkanoyl, benzoyl, mono-lower alkoxy-benzoyl, di-lower alkoxy-benzoyl, methylenedioxy-benzoyl, O-carbo-lower alkoxy-syringoyl, phenylacetyl, cinnamoyl, tri-lower alkoxy-cinnamoyl, furoyl, nicotinoyl, isonicotinoyl, and therapeutically active acid addition salts thereof.

2. Methyl O-nicotinoyl-reserpate N-oxide.
3. Methyl O-acetyl-reserpate N-oxide.
4. Rescinnamine N-oxide.
5. n-Butyl O-acetyl-reserpate N-oxide.

6. A process which comprises the step of treating a compound having the general formula:

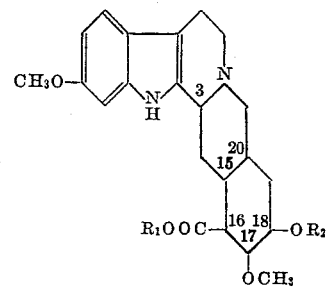

wherein $R_1$ is a member of the group consisting of hydrogen and lower alkyl and R₂ is a member of the group consisting of hydrogen, lower alkanoyl, benzoyl, mono-lower alkoxy-benzoyl, di-lower alkoxy-benzoyl, tri-lower alkoxy-benzoyl, methylene-dioxy-benzoyl, O-carbo-lower alkoxy-syringoyl, phenylacetyl, cinnamoyl, tri-lower alkoxy-cinnamoyl, furoyl, nicotinoyl, isonicotinoyl, and which possesses the stereoconfiguration of reserpine in the 3-, 15- and 20-positions, with about one molar equivalent of a member selected from the group consisting of hydrogen peroxide, ozone, mono-persulfuric acid, p-toluene-persulfonic acid and organic percarboxylic acids, at a depressed temperature, and isolating the resulting N-oxide.

7. A process which comprises treating O-nicotinoyl-reserpate with about one molar equivalent of a member of the group consisting of hydrogen peroxide, ozone, mono-persulfuric acid, p-toluene-persulfonic acid and organic percarboxylic acids, at a depressed temperature, and isolating the resulting N-oxide.

8. A process which comprises the step of treating methyl-O-acetyl-reserpate with about one molar equivalent of a member selected from the group consisting of hydrogen peroxide, ozone, mono-persulfuric acid, p-toluene-persulfonic acid and organic percarboxylic acids, at a depressed temperature, and isolating the resulting N-oxide.

9. A process which comprises the step of treating rescinnamine with about one molar equivalent of a member selected from the group consisting of hydrogen peroxide, ozone, mono-persulfuric acid, p-toluene-persulfonic acid and organic percarboxylic acids, at a depressed temperature, and isolating the resulting N-oxide.

10. A process which comprises the step of treating reserpine with about one molar equivalent of a member selected from the group consisting of hydrogen peroxide, ozone, mono-persulfuric acid, p-toluene-persulfonic acid and organic percarboxylic acids, at a depressed temperature, and isolating the resulting N-oxide.

References Cited in the file of this patent

Helv. Chim. Acta, vol. 35, pp. 862–4 (Karrer et al.) (1952).

Jacs, Vol. 75, pp. 3371–6 (1953) (Witkop).